July 10, 1928.
R. M. CRITCHFIELD
SOUND SIGNAL
Filed Sept. 23, 1927
1,676,528
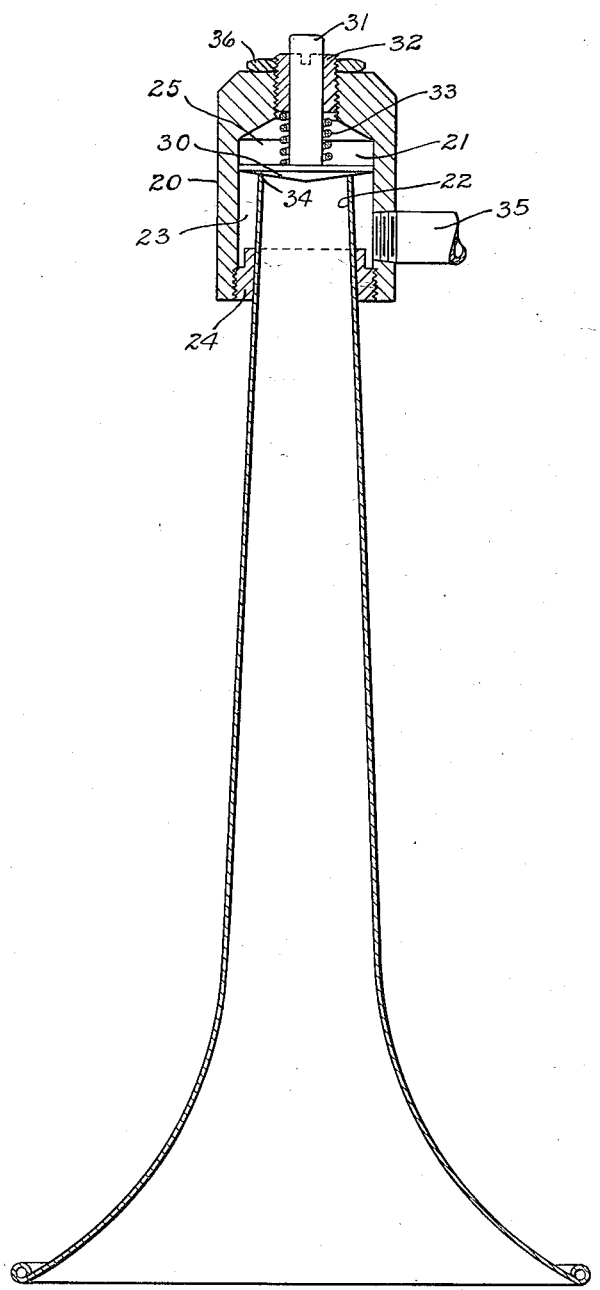

Patented July 10, 1928.

1,676,528

UNITED STATES PATENT OFFICE.

ROBERT M. CRITCHFIELD, OF ANDERSON, INDIANA, ASSIGNOR TO DELCO-REMY CORPORATION, OF DAYTON, OHIO, A CORPORATION OF DELAWARE.

SOUND SIGNAL.

Application filed September 23, 1927. Serial No. 221,472.

This invention relates to warning signals for vehicles and particularly to the type of signal which is operated by fluid pressure such as compressed air.

It is among the objects of the present invention to provide a warning signal of simple and economical construction in which only a rigid disc valve is used to control the passage of air intermittently from an air chamber to the horn or projector in order to vibrate the column of air in the projector. The present invention therefore eliminates the use of more expensive and less durable diaphragms which heretofore have been used in horns of this type.

Further objects and advantages of the present invention will be apparent from the following description, reference being had to the accompanying drawing, wherein a preferred form of embodiment of the present invention is clearly shown.

The figure of the drawing is a longitudinal, sectional view of a horn embodying the present invention.

Referring to the drawing, 20 designates the horn body which may be supported in any suitable manner not shown and which is provided with a cylindrical recess 21. The throat 22 of the horn or projector extends part way into the recess 21 and is located coaxially of the recess so that there is an annular space 23 providing an air chamber between the throat 22 and the body 20. An annular member 24, to which the throat 22 may be permanently attached if desired, is screw-threaded into the open end of the recess and therefore plugs that portion of the annular space 23 which is adjacent the normally open end of the recess.

The valve for controlling intermittently the admission of air from the chamber 23 to the projector throat 22, comprises a valve disc 30 having a relatively snug sliding fit with the cylindrical wall of the recess 21 so as to be guided thereby and to materially restrict the passage of air from the annular space 23 to the space 25 of the recess 21 which is behind the valve disc 30. The disc 30 is provided with a stem or shank in the form of a rod 31 which is slidably guided by a plug 32 screw-threaded into the body 20. The shank 31 has a relatively snug sliding fit with the plug 32. In practice, for example, if the diameter of the recess 21 is one inch, the diameter of the disc 30 should be .002 less than the diameter of the recess and the diameter of the shank 31 should be .002 less than the diameter of the plug 32.

A spring 33 located between the plug 32 and the disc 30 yieldingly urges the disc against a valve seat 34 provided by the inner circular edge of the throat 22. Pressure fluid is admitted to the chamber 23 through a duct 35. As is well understood by those skilled in the art, the admission of fluid under certain pressure will produce a reciprocation of the valve 30 in order to admit air to the projector in a rapidly recurring succession of puffs of air, thus effecting the vibration of a column of air in the projector. The pitch of the tone produced by the horn varies according to the rate of reciprocation of the valve 30 and this rate may be varied by varying the initial compression of the spring 33. This is accomplished by screwing the plug 32 in or out of the body 20, the plug being locked in adjusted position by a lock nut 36.

From the foregoing description it is apparent that the present invention provides a warning signal of exceedingly simple construction and of relatively great durability. Heretofore it has been the practice to employ a flexible diaphragm as the movable end wall member of the annular air chamber which surrounds the throat of the projector, the diaphragm also cooperating as a valve member with the end of the projector throat to control the intermittent admission of air to the projector. Such a diaphragm wall and valve member is subjected to stresses which will cause it soon to break or tear. Therefore these diaphragms must be frequently replaced. The disc valve of the present invention is not subjected to stresses similar to those existing in a vibrating diaphragm supported at its edges, hence, a failure of the disc valve is exceedingly rare. In fact the only element subject to breakage in service is the spring 33 which may be replaced by unscrewing the plug 32.

While the form of embodiment of the present invention as herein disclosed, constitutes a preferred form, it is to be understood that other forms might be adopted, all coming within the scope of the claims which follow.

What is claimed is as follows:

1. A fluid pressure operated sound signal comprising, in combination, a body member having a cylindrical recess, a wall member for closing one end of the recess and having an aperture coaxial with the recess, a projector having its throat projecting through said aperture and spaced from the cylindrical wall of said recess, a rigid disc having a sliding fit within the cylindrical wall of said recess, resilient means for urging the disc against the end of the throat within the recess, and a fluid pressure inlet duct leading into the space within the body and exterior to the projector throat and between the apertured end wall and the disc.

2. A fluid pressure operated sound signal comprising, in combination, a body member having a cylindrical recess, a wall member for closing one end of the recess and having an aperture coaxial with the recess, a projector having its throat projecting through said aperture and spaced from the cylindrical wall of said recess, a rigid disc having a sliding fit within the cylindrical wall of said recess, a rod to which the disc is attached, said rod being received within a hole provided in the end wall of the body adjacent the disc, a helical coil spring surrounding the rod and located between the disc and the body member for urging the disc against the end of the throat of the projector within the recess, and a fluid pressure inlet duct leading into the space between the body and the exterior of the projector.

3. A fluid pressure operated sound signal comprising, in combination, a body member having a cylindrical recess, a wall member for closing one end of the recess and having an aperture coaxial with the recess, a projector having its throat projecting through said aperture and spaced from the cylindrical wall of said recess, a rigid disc having a sliding fit within the cylindrical wall of the recess, a tubular bushing threaded into a hole tapped in the end wall of the body which is adjacent the disc, a rod attached to the disc and guided by the bushing, and a helical coil spring surrounding the rod and located between the disc and the inner end of the bushing whereby the bushing operates to guide the rod and may be adjusted relative to the body member to vary the pressure of the disc against the end of the projector throat.

In testimony whereof I hereto affix my signature.

ROBERT M. CRITCHFIELD.